United States Patent [19]
O'Connor

[11] Patent Number: 6,085,012
[45] Date of Patent: Jul. 4, 2000

[54] PLANAR WAVEGUIDE AND METHOD OF FORMING THE SAME

[75] Inventor: Dennis M. O'Connor, Chandler, Ariz.

[73] Assignee: Intel Corporation, Santa Clara, Calif.

[21] Appl. No.: 09/310,018

[22] Filed: May 11, 1999

Related U.S. Application Data

[62] Division of application No. 08/928,809, Sep. 12, 1997, Pat. No. 5,949,942.

[51] Int. Cl.$^7$ ...................................................... G02B 6/10
[52] U.S. Cl. ............................................................ 385/129
[58] Field of Search .................................... 385/129–132, 385/147; 359/332; 427/58, 163.1; 29/25.01; 428/615, 364

[56] References Cited

U.S. PATENT DOCUMENTS

| | | | |
|---|---|---|---|
| 5,155,791 | 10/1992 | Hsiung | 385/122 |
| 5,630,004 | 5/1997 | Deacon et al. | 385/129 |
| 5,732,177 | 3/1998 | Deacon et al. | 385/122 |
| 5,835,458 | 11/1998 | Bischel et al. | 369/112 |
| 5,911,018 | 6/1999 | Bischel et al. | 385/131 |
| 5,949,942 | 9/1999 | O'Connor | 385/129 |

*Primary Examiner*—Akm E. Ullah
*Attorney, Agent, or Firm*—Blakey, Sokoloff, Taylor & Zafman LLP

[57] ABSTRACT

The invention relates to a waveguide and a method of forming a waveguide. The waveguide includes a corrugated polymer sheet having a top layer, a middle layer, and a bottom layer. Each of the top layer, the middle layer, and the bottom layer are defined by an index of refraction.

8 Claims, 6 Drawing Sheets

PLANAR WAVEGUIDE AND METHOD OF FORMING THE SAME

This application is a division of Ser. No. 08/928,809 filed Sep. 12, 1997 now U.S. Pat. No. 5,949,942.

BACKGROUND OF THE INVENTION

1. Field of the Invention

The invention relates to the field of optics and more particularly to waveguides and methods of forming waveguides.

2. Description of Related Art

A fiber optic waveguide is generally used in the transmission of speech, data, pictures, or other information by light. An optical communication system is a system that utilizes an information-carrying light wave signal that originates in a transmitter, passes through an optical channel, and enters a receiver that reconstructs the original information.

A fiber optic waveguide is conventionally a cylindrical structure of two indices of refraction, an inner core and an outer cladding. The inner core has a first index of refraction that is typically greater than the index of refraction of the outer cladding. Light travels through the fiber by a process of total internal reflection wherein the light is restricted or guided through the fiber in a single dimension. In other words, a fiber waveguide restricts light in two dimensions, the two directions that are orthogonal to the desired direction, so that light will internally reflect and travel in the remaining direction.

There are basically two types of fiber optical material. The first is a glass fiber used commonly to carry light a considerable distance. Another type of fiber is a polymer-based fiber that is, generally, considerably less expensive than glass fiber optical material. A polymer-based fiber optic is, generally, produced in one of two ways. The first method is by a coaxial extrusion process. In this process, a first polymer material of typically a high index of refraction is put through an extruder to produce a small inner fiber that is the core. A second material of lower index of refraction, is then displaced around the inner core to form the cladding. Typically this is accomplished by placing the inner core in a melt of the lower index of refraction material to place the cladding about the core.

Another method of making a polymer-based fiber optic is by a diffusion method. In this process, an initial fiber form, typically of a high index of refraction, is created by an extrusion process. Next, a second material of lower index of refraction is placed around the initial form and caused to diffuse into the form, thereby modifying the refractory properties of the outer portion of the inner form. The fiber created by this process is known as a graded-index of refraction material. The amount of diffusion varies with the time allotted for the diffusion process and the materials used. Thus, a graded index multi-mode fiber is a fiber where the core refractive index decreases with increased radial distance. This method is detailed in Y. Outsuka, Appl. Phy. Lett., 23(5), 247 (1973). In Outsuka, a cross-linked monomer, diallylisophthalate or diethylene glycol bis-allylcarbonate, is partially polymerized to a gel and immersed or exposed to a monomer with a lower index of refraction, such as methyl methacrylate. The monomer gets incorporated into the gel by diffusion and polymerizes to form the outer cladding.

Other ways of making polymer-based optical fibers include thermally activated solvent-assisted infusion of a monomer into polymethyl methacrylate, an ultraviolet-based polymerization.

Another type of optical material used to carry light waves, typically a shorter distance, is a planar optical sheet. The conventional use for such a sheet is in a planar optical display ("POD") device. A POD utilizes a number of optical sheets stacked one on top of each other, each sheet carrying different optical information to convey the information from a transmitter to a receiver. The optical sheet is a planar version of the optical fiber, in that the sheet guides light by the same optical process used in fiber optics. Unlike the optical fiber, however, which restricts the travel of light in two dimensions (i.e., the two dimensions orthogonal to the desired travel of the light), the planar optical sheet restricts light in only a single dimension. FIG. 1 illustrates a sheet of optical material 5 that is used, for example, in a planar optical display device. FIG. 1 illustrates a schematic cross-sectional side view of optical sheet 5. The sheet of optical material 5 is constructed similar to an optical fiber as discussed above and contains an inner core material 10 of a high index of refraction polymer material and an outer cladding material 20 of a polymer having a lower index of refraction. In FIG. 1, a wave of light 100 is restricted only in the Y-direction, thus leaving the X- and Z-directions available for travel. Thus, an optical signal sent along the X-direction can spread out in the Z-direction as it travels through the sheet of optical material 5.

FIG. 2 illustrates a schematic top perspective view of a portion of optical sheet 5 presented in FIG. 1. FIG. 2 shows that a wave of light 100 propagated in the X-direction can spread out in optical sheet 5 in the Z-direction. Wave of light 100 is restricted from traveling in the Y-direction by outer cladding 20.

Optical sheet 5 is produced in a manner similar to the production of optical fibers discussed above. The two main methods of producing optical sheet 5 are the step-index and graded-index. To produce a step-index of refraction optical sheet by a co-extrusion method a hot polymer material of high index refraction is directed through a die extruder where it spreads out into a plastic sheet or film. A second material having a lower index of refraction relative to the higher index of refraction core is co-extruded on the top side and on the bottom side of the polymer sheet or film. The step-index of refraction is created by a distinguishable demarcation between the index of refraction of the first material and the second material.

A graded-index of refraction material is created by forming an inner core sheet or film of a polymer material having a high index of refraction and overlying and underlying that material with a second polymer material or coating having a lower index of refraction relative to the index of refraction of the core sheet or film. In this case, a diffusion process takes place wherein a portion of the lower index of material polymer diffuses into the top and bottom sides of the core polymer sheet or film.

FIG. 3 schematically illustrates a display assembly utilizing a POD device. The use of a POD device for displaying an image has advantages over conventional lens/mirror arrangements. For example, in many applications, especially when a relatively large display must fit in a compact enclosure, POD devices offer better depth of field focus characteristics than lens/mirror arrangements. With lens/mirror arrangements, a reflected image is spread out about, for example, a display screen such that portions of a display screen image will be closer to the reflected image than other portions of the display screen image. This creates depth of field focus issues that are addressed by the use of additional mirrors. With a POD device, an image is focused on the bottom of the POD device and is displayed at the other end of the POD in the same focus and without depth of field focus issues.

In FIG. 3, POD 40 is made up of a plurality of optical sheets 30 laminated together and formed into a triangular or wedge-shaped device. The assembly in FIG. 3 is, for example, a laser scanning system where a laser 50 generates a display by scanning and modulation. The laser sweeps an image and paints the image to a viewer of a POD display. Laser 50 sends image (light waves) 100 to modulator 60. Image 100 is reflected off scanning mirror 70 and projected by scanning mirror 70 at the base of POD 30 into POD 30. From there, image 100 is carried up through the POD layers or optical sheets 40 and projected to a viewer of the display system. The use of the individual layers or optical sheets 30 keep the laser light images separate from one another so that a sharp image is displayed to the viewer. Laser generated image 100 is projected onto the bottom of POD 40 in sharp focus in a direction orthogonal to the layers or optical sheets 30 because laser 50 prevents the light from spreading. Once image 100 is transferred to POD 40, however, the image is restricted in only one orthogonal direction, thus allowing the light waves of the image to spread out. The use of POD 30 in a laser scanning system is acceptable because the laser produces single frequency, well-collinated light and the margin of dispersion or spreading out of the light in an undesirable orthogonal direction once in POD 40 is acceptable for many uses. However, such would not be the case in, for example, lens/mirrors systems or other systems that do not use well-collinated light.

What is needed is an optical sheet capable of restricting the travel of light in two directions.

SUMMARY OF THE INVENTION

A waveguide and a method of forming a waveguide are disclosed. The waveguide includes a corrugated polymer sheet having a top layer, a middle layer, and a bottom layer. Each of the top layer, the middle layer, and the bottom layer are defined by an index of refraction. The waveguide restricts the travel of light in two directions similar to an optical fiber.

Additional features and benefits of the invention will become apparent from the detailed description, figures, and claims set forth below.

DETAILED DESCRIPTION OF THE INVENTION

Embodiments in accordance with the invention include a waveguide and a method of forming a waveguide having a corrugated polymer sheet that restricts the direction of light propagation in two directions. Other embodiments include a planar optical display and a method of forming a planar optical display of corrugated polymer sheets. In the following description, numerous specific details are set forth such as specific materials, processing steps, process parameters, etc., in order to provide a thorough understanding of the invention. One skilled in the art will understand that these specific details need not be employed to practice the invention.

Figure 1:
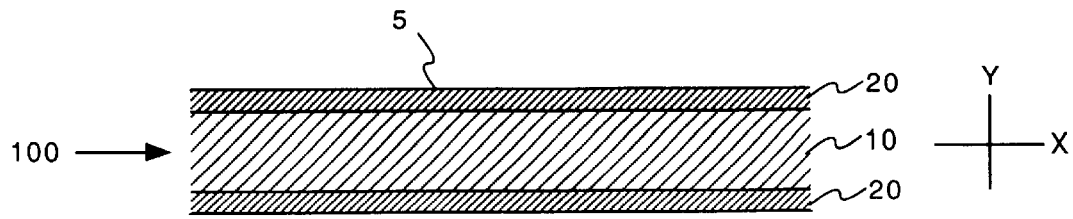
FIG. 1 is a schematic planar side view of a portion of an optical sheet.
Figure 2:
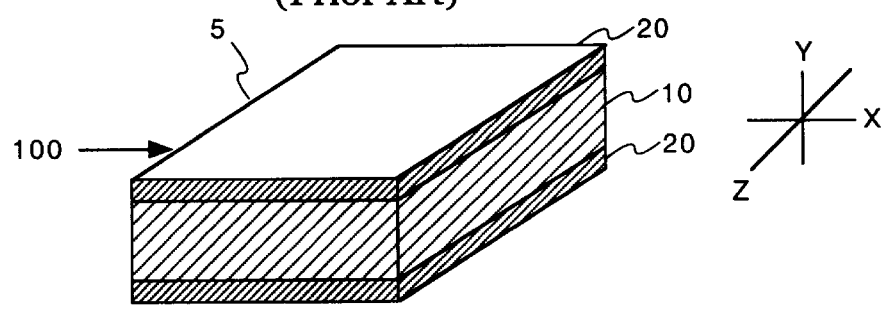
FIG. 2 is a schematic top perspective view of a portion of the optical sheet of FIG. 1.
Figure 3:
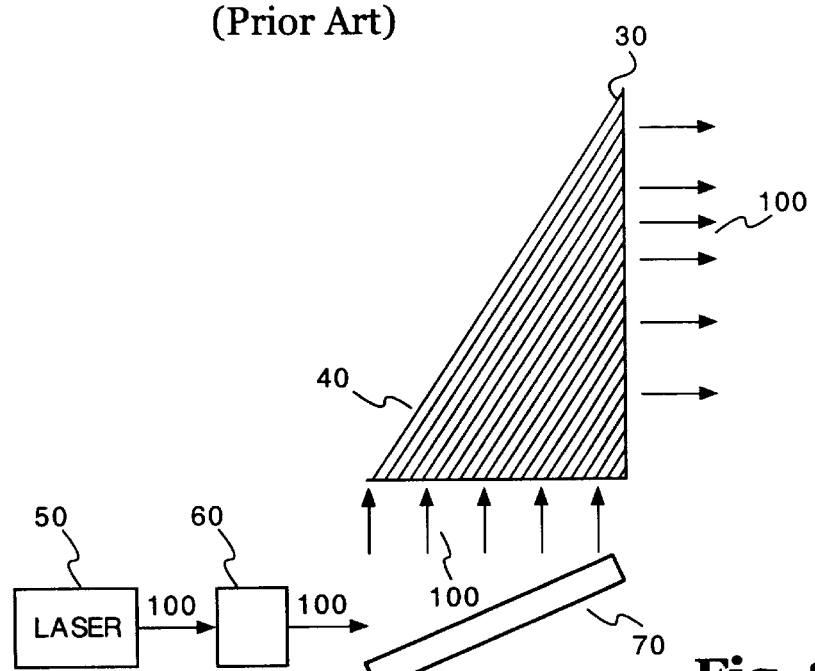
FIG. 3 is a schematic of a laser scanning system utilizing a POD device.
Figure 4:
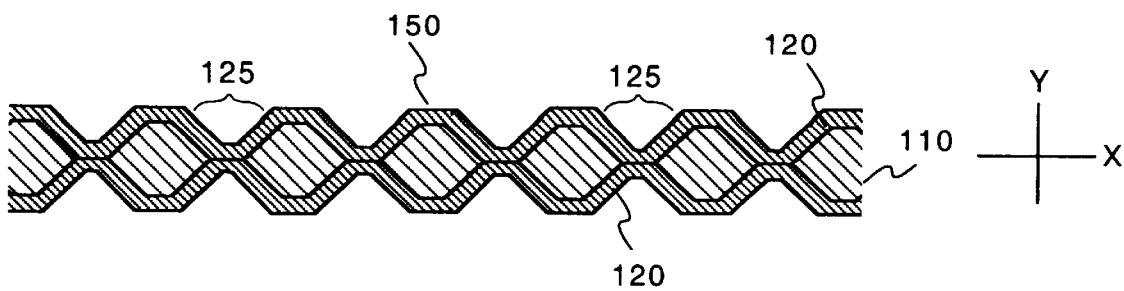
FIG. 4 presents a schematic cross-sectional planar side view illustration of a corrugated optical sheet in accordance with the invention.

FIG. 4 shows a cross-sectional schematic side view of an optical sheet in accordance with the invention. Optical sheet 150 in FIG. 4 is "corrugated", meaning it has alternative ridges and grooves. The inner or core material 110 has a first index of refraction. The outer "layers" 120 represent either a step-change in the index of refraction of the material or a gradual change in the index of refraction, depending on the type of change in refractive index being manufactured. The desired direction of light propagation is perpendicular to the page. Outer layers 120 restrict light propagation in the Y-direction. The outer layers substantially come together at grooved regions 125 restricting light propagation in the X-direction. The two-dimensional guiding layers act like thousands of fiber optic strands joined in parallel on the same plane, but are manufactured using optical sheet manufacturing processes.

Figure 5:
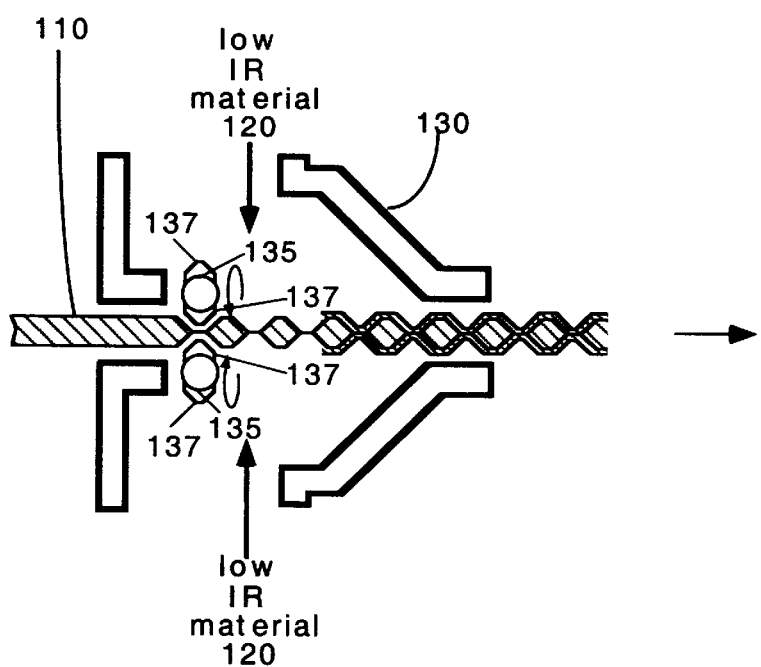
FIG. 5 is a schematic planar side view illustration of a process embodiment for making a corrugated planar material in accordance with the invention.

FIG. 5 represents a schematic illustration of a process of forming a corrugated or two-dimensional guiding optical sheet. FIG. 5 shows that an inner layer material 110, such as for example polycarbonate, is extruded through a die 130 with the desired physical profile of a "corrugated" sheet 110. To make the desired profile, sheet 110 is corrugated by opposing cammed shafts 135 each with a plurality of cams 137 that extend the width of sheet 110 and that deform material 110 into the desired corrugated shape. In one embodiment, the grooves in corrugated material 110 directly oppose one another, so, in this instance, opposing caMmed shafts 135 rotate together and have cams 137 that directly oppose one another to produce the desired shape. Next, a second material 120, such as, for example, a lower index of refraction material, such as poly(4-methylpentene-1), is applied to the top side and the bottom side of corrugated material 110. It is to be appreciated that the same material need not be applied to the top and bottom side of corrugated material 110. Instead, different materials can be used, so long as each of the differing materials has an index of refraction different than material 110.

In the process embodiment described, the desired optical sheet is a step-change index of refraction sheet. Layer 120 is applied to polymer layer 110 and through a chemical interaction of the polymer will bind to polymer layer 110 and produce a step-change in the index of refraction, with layers 120 being of, for example, a lower index of refraction than core polymer layer 110.

Alternatively, material 120 can be a polymer that penetrates into polymer layer 120 through the process of diffusion to create a graded index of refraction. For example, a first material of a diallylisophthalate or diethylene glycol bisallylcarbonate that is partially polymerized to a gel form is exposed to a second material 120 that is a monomer having a lower index of refraction, such as, for example, methyl methacrylate. The methyl methacrylate layer 120 is incorporated into gel material 110 by diffusion, the amount of incorporation varying with time and temperature to produce a final polymer layer having a corrugated shape with a graded-index of refraction.

Figure 6:
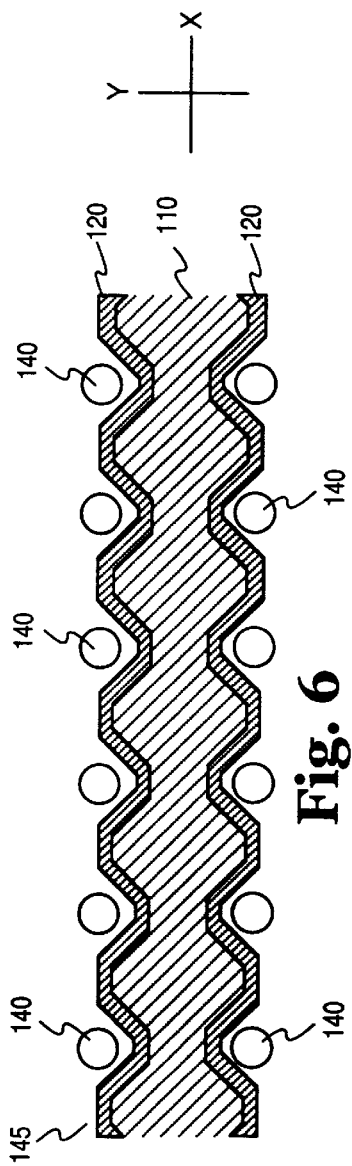
FIG. 6 is a schematic planar side view illustration of a second process embodiment for making a corrugated planar material sheet in accordance with the invention wherein a planar optical sheet is passed through a plurality of opposing rollers to deform the sheet.
Figure 7:
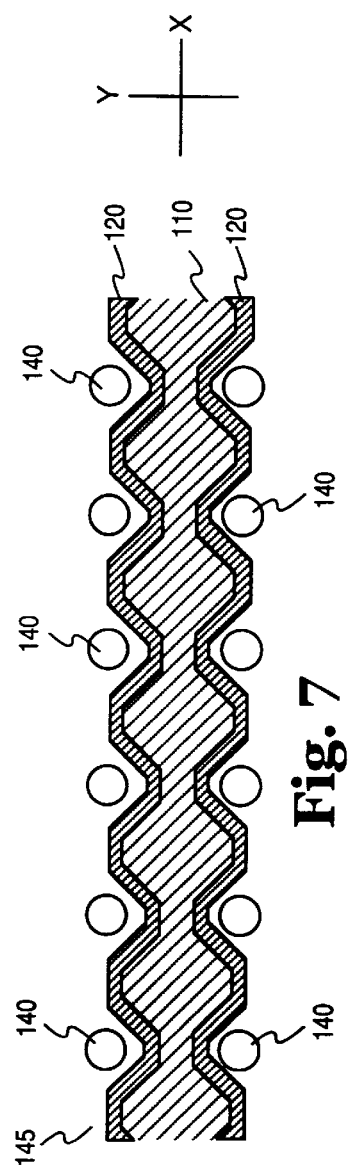
FIG. 7 is a schematic illustration of the process depicted in FIG. 6 and further showing the sheet passing through opposing rollers a second time to further deform the sheet.
Figure 8:
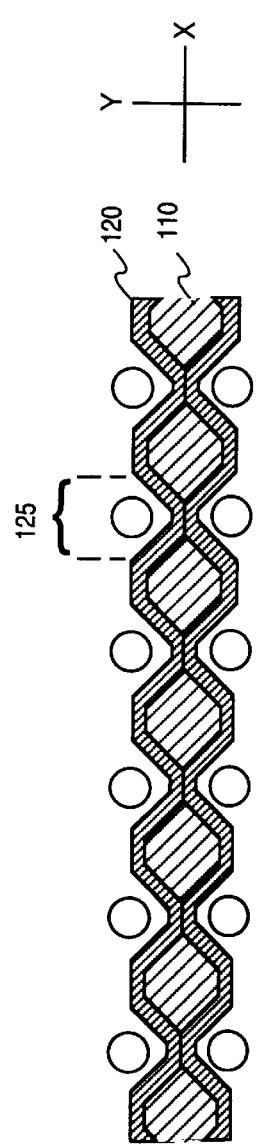
FIG. 8 is a schematic illustration of the process depicted in FIGS. 6–7 and further showing the sheet passing through opposing rollers a third time to further deform the sheet.

FIGS. 6–8 presents a second process for making the corrugated or two-dimensional-guiding polymer sheet of the invention. In FIGS. 6–8, sheet 145 is deformed into the desired profile by way of an array of opposing rollers 140 applied to the top and bottom of extruded sheet 145 as the sheet passes by rollers 140. In FIGS. 6–8, sheet 145 is moving perpendicular to the page to deform sheet 145 in such a way that light can be propagated through sheet 145 in a direction perpendicular to the page. The array of opposing rollers 140 are configured so as to produce parallel grooves or corrugations in sheet 145.

In the second process embodiment, the deformation of sheet 145 can be accomplished successively, by passing the sheet through rollers 140 more than once. In this manner, flat sheet 145 is partially deformed by opposing rollers 140 on a first pass between rollers 140 as shown in FIG. 6. Rollers 140 are then adjusted so that sheet 145 is further deformed toward the desired shape (e.g., toward substantially inhibiting light propagation in the X-direction) and sheet 145 is passed between opposing rollers 140 a second time as shown in FIG. 7. Rollers 140 are again adjusted and sheet 145 passed through opposing rollers 140 a third time to attain the desired shape as shown in FIG. 8 (e.g., substantially inhibit light propagation in the X-direction). The outer layers 120 of sheet 145 restrict light propagation in the Y-direction and grooved regions 125 restrict light in the X-direction. The multiple passes between opposing rollers 140 permit a careful control of the desired sheet deformation. Because sheet 145 is not uniform, e.g., it is made of materials with different indices of refraction, such careful control is desirable. Alternatively, sheet 145 can be deformed by a single pass through the plurality of opposing rollers 145, provided rollers 145 are adjusted to the desired deformation level.

Figure 9:
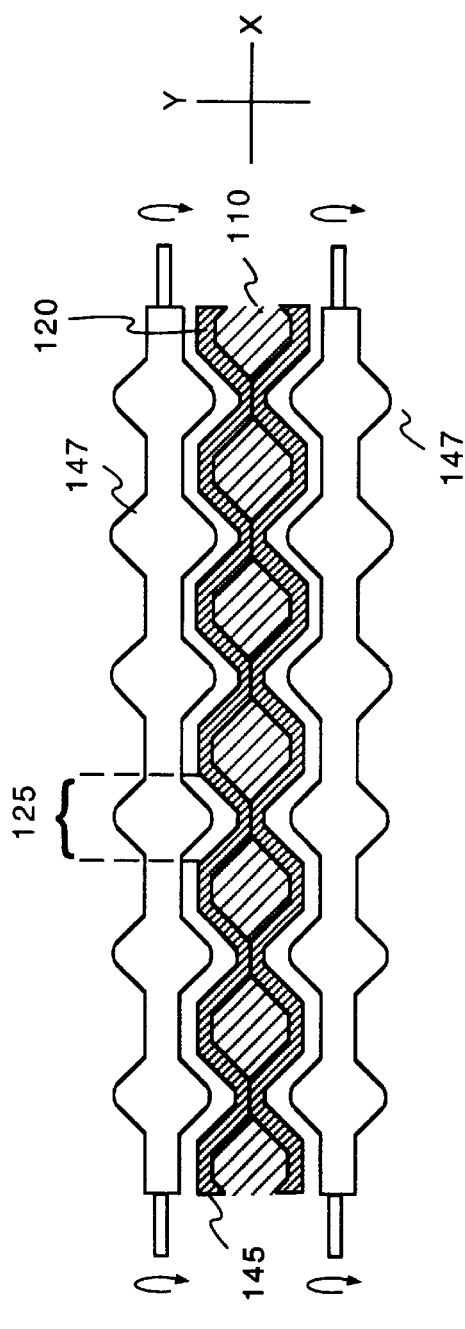
FIG. 9 is a schematic planar side view illustration of a third process embodiment for making a corrugated planar optical material sheet in accordance with the invention wherein a planar optical material sheet is passed between opposing deformed elongated members.

FIG. 9 presents another embodiment of a process for making the corrugated or two-dimensional-guiding polymer sheet of the invention. In FIG. 9, rollers 140 (of FIGS. 6–8) are replaced by opposing elongated members 147 preformed to produce the desired shape to a sheet 145 that is passed between members in a direction perpendicular to the page. In FIG. 9, elongated members 147 are substantially flat members that are rotated about the X-axis to produce a cylindrical volume upon rotation. Elongated members 147 can be utilized in a manner similar to FIGS. 6–8 where a desired sheet profile is formed by multiple passes, or elongated members 147 may be adjusted to completely deform sheet 145 to the desired profile on a single pass.

In the processes described with reference to FIGS. 6–9, flat sheet 145 is made up of a core polymer 110 having a high index of refraction and top and bottom polymer layers 120 having a low index of refraction relative to the index of refraction of core polymer 110. In these process embodiments, since the deformation occurs after sheet 145 formation, sheet 145 may be formed by any of the prior art known techniques, including, but not limited to, the step-index and graded-index methods.

In one embodiment of making the final corrugated structure by the processes illustrated in FIGS. 6–9, grooves or indentations 125 in the sheet are substantially aligned or parallel with one another so that two-dimensional guiding sheet 145 acts like a plurality of fiber optic strands joined in parallel on the same plane. In the corrugated portion of sheet 145 shown in FIGS. 6–9, outer layers 120 restrict light propagation in the Y-direction and grooved regions 125 restrict light propagation in the X-direction.

Figure 10:
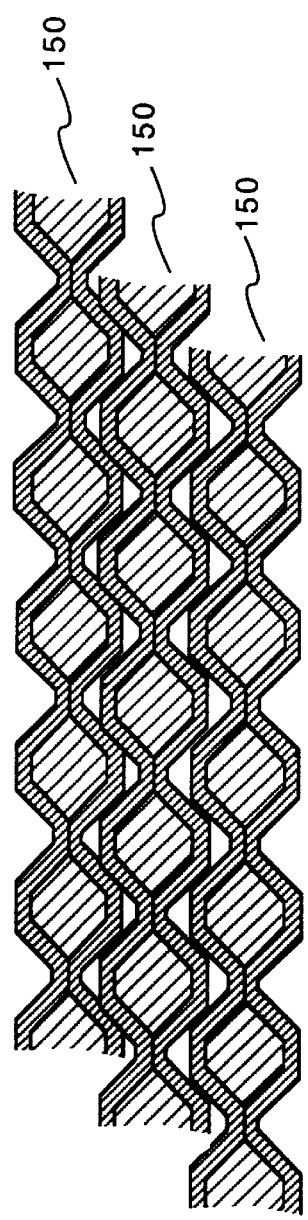
FIG. 10 is a schematic planar side view illustration of a plurality of optical sheets arranged as self-aligned two-dimensional-guiding POD layers.
Figure 11:
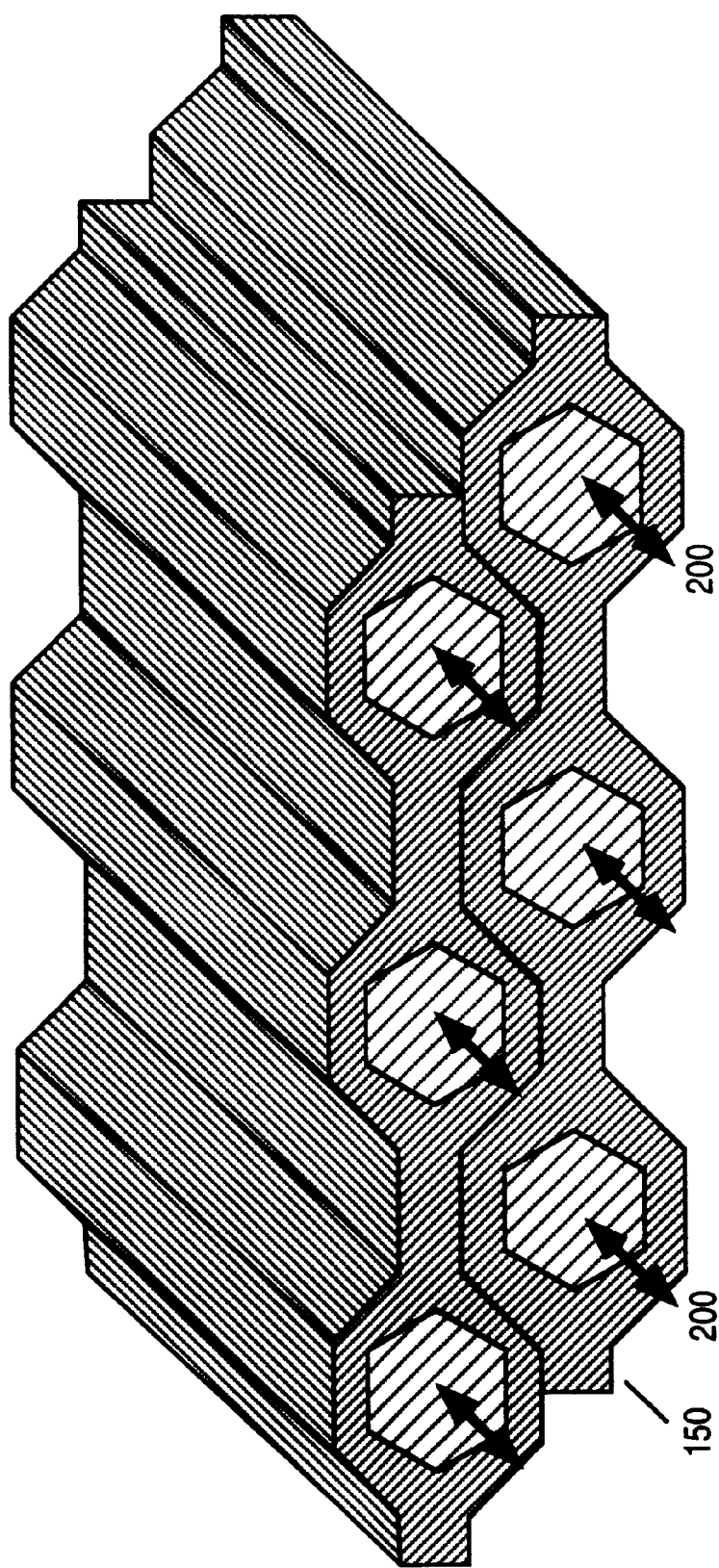
FIG. 11 is a schematic perspective top view illustration of a pair of optical sheets arranged as a second embodiment of self-aligned two-dimensional-guiding POD layers.

FIG. 10 shows a planar side view of a plurality of corrugated sheets 150 stacked adjacent one another to form, for example, a POD. FIG. 11 shows a perspective top view of another embodiment of a pair of corrugated polymer sheets 150 stacked together. FIG. 11 indicates the direction of travel of light by reference numeral 200.

The layers of FIG. 10 or FIG. 11 may be stacked together and glued or laminated. Alternatively, layers 150 may be connected by a vacuum seal wherein remaining air volume between sheets 150 is removed. In combining layers 150 together, the light waveguides within each layer, which are already parallel to one another, will be parallel to the guides in the other layers. Absent such alignment, each horizontal segment of a projected image could be offset from its neighbors which could produce poor image quality. The surface profile of each sheet 150 promotes correct directional alignment of the layers. Thus, the task of combining them, through lamination or otherwise, is made much easier. In other words, a profile where the ridges of one layer 150 fall into the groove of another layer 150 makes alignment easier when compared to the prior art one-dimensional-guiding POD layers having no requirement for alignment.

Figure 12:
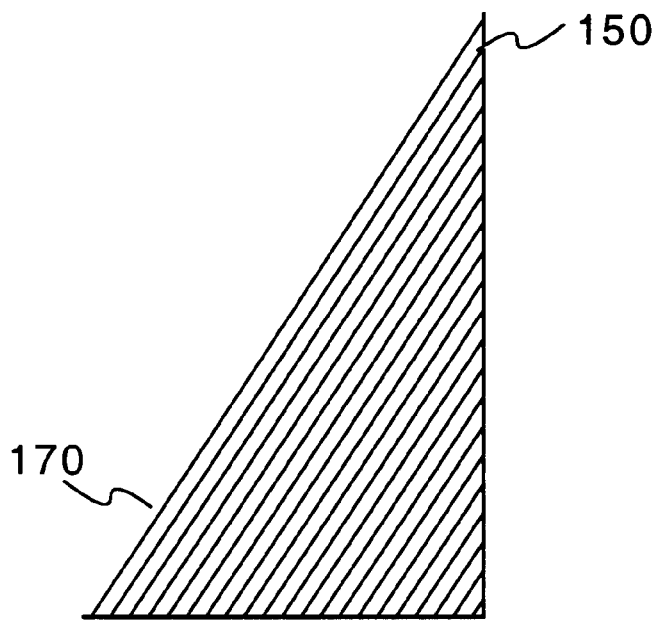
FIG. 12 is a schematic planar side view of a POD device.
Figure 13:
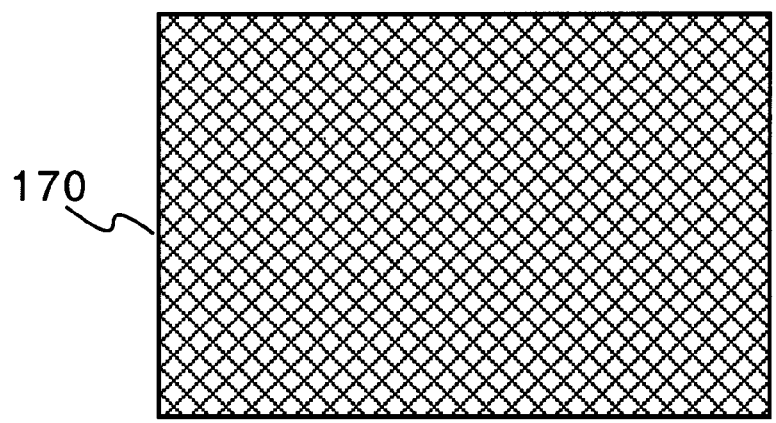
FIG. 13 is a schematic planar front view of the POD device of FIG. 12.

FIGS. 12 and 13 show a plurality of corrugated polymer sheets 150 combined to form POD structure 170. FIG. 12 is a planar side view of the POD structure, while FIG. 13 is a front side view of POD structure 170 of FIG. 12 and schematically illustrates the restriction of light propagation to perpendicular to the surface of the paper. The invention contemplates that the corrugated layers guide light in two dimensions so as to act like thousands of fiber optic strands joined in parallel on the same plane. The POD structure shown in FIGS. 12–13 does not suffer from the problems associated with the prior art, because the image projected on the bottom of the POD is kept in sharp focus in directions orthogonal to the travel of the light because the light cannot spread out into such orthogonal layers. Further, because the individual layers of the POD are self-aligned by aligning the grooves and ridges of neighboring sheets, the light guides within the many layers are parallel and correct directional alignment of the layers is achieved. The image projected on the bottom of the POD is the image displayed upon exit from the POD.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method of forming a waveguide comprising:

forming a corrugated first polymer sheet having a top surface, a middle portion, and a bottom surface, said polymer sheet further having a first index of refraction;

coating said top surface and said bottom surface of said first polymer sheet with a second polymer, said second polymer having a second index of refraction; and permitting said second polymer to diffuse into a portion of said top surface and into a portion of said bottom surface of said first polymer.

2. The method of claim 1, wherein said second index of refraction is less than said first index of refraction.

3. A method of forming a planar optical display comprising:

forming a plurality of corrugated first polymer sheets, each first polymer sheet having a top surface, a middle portion, and a bottom surface, each of said polymer sheets further having a first index of refraction;

coating said top surface and said bottom surface of each of said first polymer sheets with a second polymer, said second polymer having a second index of refraction; and permitting said second polymer to diffuse into a portion of said top surface and into a portion of said bottom surface of said first polymer; and positioning each of said plurality of first polymer sheets adjacent to one of said top layer and said bottom layer of another of said plurality of said sheets.

4. The method of claim 3, wherein said second index of refraction is less than said first index of refraction.

5. A method of forming a waveguide comprising:

forming a first polymer sheet having a top surface, a middle portion, and a bottom surface, said polymer sheet further having a first index of refraction forming a second polymer sheet having a second index of refraction adjacent said top surface of said first polymer sheet and adjacent said bottom surface of said first polymer sheet; and corrugating said first and second polymer sheets.

6. The method of claim 5, wherein said second index of refraction is less than said first index of refraction.

7. A method of forming a planar optical display comprising:

forming a plurality of first polymer sheets, each of said first polymer sheets having a top surface, a middle portion, and a bottom surface, each of said polymer sheets further having a first index of refraction;

forming a second polymer sheet having a second index of refraction adjacent said top surface of each of said first polymer sheets and adjacent said bottom surface of each of said first polymer sheets;

corrugating said first and second polymer sheets; and positioning each of said plurality of first polymer sheets adjacent to one of said top layer and said bottom layer of another of said plurality of said sheets.

8. The method of claim 7, wherein said second index of refraction is less than said first index of refraction.

* * * * *

UNITED STATES PATENT AND TRADEMARK OFFICE
CERTIFICATE OF CORRECTION

PATENT NO. : 6,085,012  
DATED : July 4, 2000  
INVENTOR(S) : Dennis M. O'Connor Page 1 of 1

It is certified that error appears in the above-identified patent and that said Letters Patent is hereby corrected as shown below:

Column 4,  
Line 64, delete "caMmed" and insert -- cammed --.

Signed and Sealed this

Twenty-sixth Day of February, 2002

*Attest:*

JAMES E. ROGAN  
*Attesting Officer*  *Director of the United States Patent and Trademark Office*